(12) United States Patent
Bachmeier et al.

(10) Patent No.: US 11,040,655 B2
(45) Date of Patent: Jun. 22, 2021

(54) INTERIOR ASSEMBLY FOR A MOTOR VEHICLE AND METHOD FOR PRODUCING AN INTERIOR ASSEMBLY

(71) Applicant: Bayerische Motoren Werke Aktiengesellschaft, Munich (DE)

(72) Inventors: Johannes Bachmeier, Munich (DE); Helmut Leopold, Munich (DE); Matthias Lindner, Graefelfing (DE); Florian Miedl, Munich (DE); Maximilian Prex, Gerzen (DE); Heinz Sperl, Buchloe (DE); Thomas Tille, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/797,466

(22) Filed: Feb. 21, 2020

(65) Prior Publication Data

US 2020/0189457 A1    Jun. 18, 2020

Related U.S. Application Data

(63) Continuation of application No. PCT/EP2018/072346, filed on Aug. 17, 2018.

(30) Foreign Application Priority Data

Sep. 27, 2017    (DE) ...................... 10 2017 217 162.6

(51) Int. Cl.
*B60Q 3/62*        (2017.01)
*B60Q 3/82*        (2017.01)

(52) U.S. Cl.
CPC ................. *B60Q 3/62* (2017.02); *B60Q 3/82* (2017.02)

(58) Field of Classification Search
CPC .................................... B60Q 3/62; B60Q 3/82
(Continued)

(56) References Cited

U.S. PATENT DOCUMENTS 5,226,725 A * 7/1993 Trusiani ................. G09F 13/04
                                                    362/351
5,952,630 A * 9/1999 Filion ................... H01H 13/702
                                                    200/5 R (Continued)

FOREIGN PATENT DOCUMENTS

DE    10 2010 051 307 A1    5/2012
DE    20 2012 100 540 U1    4/2013

(Continued)

OTHER PUBLICATIONS

International Search Report (PCT/ISA/210) issued in PCT Application No. PCT/EP2018/072346 dated Nov. 21, 2018 with English translation (four (4) pages).

(Continued)

*Primary Examiner* — Bryon T Gyllstrom
(74) *Attorney, Agent, or Firm* — Crowell & Moring LLP

(57) ABSTRACT

An interior assembly for a motor vehicle includes a decorative layer and a lighting unit. The decorative layer has a plurality of cutouts which are arranged with respect to one another in such a way that they represent at least one symbol. The lighting unit is assigned to the cutouts in such a way that the light which is emitted by the lighting unit in the switched on state of the lighting unit is directed through at least some of the cutouts to a surface of the decorative layer.

10 Claims, 1 Drawing Sheet

(58) Field of Classification Search
USPC .......................................................... 362/509
See application file for complete search history.

(56) References Cited

U.S. PATENT DOCUMENTS

| | | | | |
|---|---|---|---|---|
| 6,234,651 | B1* | 5/2001 | Kodama | .................. H01H 9/18 |
| | | | | 362/276 |
| 6,382,821 | B1* | 5/2002 | Heyer | ..................... B44C 1/105 |
| | | | | 362/278 |
| 8,752,989 | B2* | 6/2014 | Roberts | ................... G09F 13/06 |
| | | | | 362/496 |
| 2006/0176685 | A1* | 8/2006 | Galli | .................... F21V 23/0414 |
| | | | | 362/157 |
| 2010/0214798 | A1* | 8/2010 | Salter | ....................... B60Q 3/43 |
| | | | | 362/520 |
| 2010/0231528 | A1* | 9/2010 | Wolfe | ................... G06F 3/0412 |
| | | | | 345/173 |
| 2010/0277938 | A1* | 11/2010 | Smith | ..................... B60Q 3/267 |
| | | | | 362/509 |
| 2014/0204599 | A1* | 7/2014 | Miura | .................. B60Q 1/2661 |
| | | | | 362/501 |
| 2017/0062153 | A1* | 3/2017 | Ben Abdelaziz | .. H03K 17/9643 |
| 2017/0158119 | A1* | 6/2017 | Weih | ......................... B60Q 3/64 |
| 2017/0232824 | A1* | 8/2017 | Salter | ..................... B60Q 3/208 |
| | | | | 362/509 |
| 2020/0262342 | A1* | 8/2020 | Irgang | ...................... B60Q 3/10 |

FOREIGN PATENT DOCUMENTS

| | | |
|---|---|---|
| DE | 10 2015 105 974 A1 | 10/2016 |
| DE | 10 2016 214 806 A1 | 2/2018 |
| FR | 3 040 336 A1 | 3/2017 |
| WO | WO 2011/103692 A1 | 9/2011 |
| WO | WO 2017/005859 A1 | 1/2017 |

OTHER PUBLICATIONS

German-language Written Opinion (PCT/ISA/237) issued in PCT Application No. PCT/EP2018/072346 dated Nov. 21, 2018 (five (5) pages).
German-language Search Report issued in counterpart German Application No. 102017217162.6 dated Jul. 3, 2018 with partial English translation (15 pages).

* cited by examiner

INTERIOR ASSEMBLY FOR A MOTOR VEHICLE AND METHOD FOR PRODUCING AN INTERIOR ASSEMBLY

CROSS REFERENCE TO RELATED APPLICATIONS

This application is a continuation of PCT International Application No. PCT/EP2018/072346, filed Aug. 17, 2018, which claims priority under 35 U.S.C. § 119 from German Patent Application No. 10 2017 217 162.6, filed Sep. 27, 2017, the entire disclosures of which are herein expressly incorporated by reference.

BACKGROUND AND SUMMARY OF THE INVENTION

An interior assembly for a motor vehicle and a method for producing an interior assembly are disclosed.

In motor vehicles, operator control elements are used to actuate electrical loads which are assigned to specific vehicle functions. These operator control elements are implemented on a standard basis by means of mechanical switches in the vehicle. The large number of electrical loads or vehicle functions in modern motor vehicles gives rise to a large number of mechanical switches. However, for reasons of ergonomy and design technology the number of mechanical switches in modern vehicles is to be kept as low as possible. In particular, mechanical switches can always be seen by vehicle occupants even if the functions are currently not required or the assigned vehicle function cannot be activated, so that the design is to a certain extent adversely effected by the switches. Furthermore, mechanical switches are illuminated by LEDs in such a way that they can also be found in the dark.

In particular in modern designs there is a desire for technical elements to move into the background and be visible only if they are required. In particular, technical elements are to be integrated into the interior parts and decorative parts. In this context, the term "Shy Technology" is also used.

Piezo-electric switches are also used instead of mechanical switches. However, piezo-switches are opaque so that functional lighting and search lighting is not easy to implement for such switches.

Therefore, one object of the present invention is to make available an interior assembly which can satisfy the design requirements and the functional requirements equally. In particular, an interior assembly is to be made available with switching elements which are virtually invisible when they are not required.

This and other objects are achieved by an interior assembly for a motor vehicle, comprising a decorative layer and a lighting unit, wherein the decorative layer has a plurality of cutouts which are arranged with respect to one another in such a way that they represent at least one symbol, and wherein the lighting unit is assigned to the cutouts in such a way that the light which is emitted by the lighting unit in the switched-on state of the lighting unit is directed through at least some of the cutouts to a surface of the decorative layer.

Such an interior assembly has the advantage that display elements and/or operator control elements can be included in a seamless fashion in the design of the interior of the vehicle. In the switched-off state of the lighting unit, the display elements and/or operator control elements are invisible to a vehicle occupant. The cutouts are perceived by the vehicle occupant only when they are illuminated from the rear, that is to say, from the side opposite the surface of the decorative layer. In this context, the large number of illuminated cutouts appears to be at least one coherent symbol to the vehicle occupant. In addition, the cutouts can be made in virtually any desired decorative material so that an interior assembly according to the invention can be integrated into any region of the vehicle. In particular, the plurality of cutouts form a plurality of symbols which are, for example, separated from one another.

The decorative layer has at least to a certain extent diffusor particles, in particular in the region of the at least one symbol. Light beams can be diffracted, in particular deflected, at the diffusor particles. This provides the advantage that in the switched-on state of the lighting unit the illustrated symbols can be recognized from all viewing directions and not only in the vertical plan view. The diffusor particles are arranged, in particular, in the region of an edge of the cutout which is arranged on a side directed toward the vehicle occupant, that is to say on the surface of the decorative layer.

The cutouts may each be filled with a material which serves as a light guide. For example, the material can be transparent and contain light-guiding particles. Therefore, a large part of the light which is irradiated by the lighting unit can be directed through the decorative element, and the symbols appear sufficiently bright and can be recognized well by a vehicle occupant. The material which serves as a light guide serves additionally to close off the cutouts. This prevents dirt from being able to settle in the cutouts.

The cutouts preferably have a diameter of less than 1 mm, in particular less than 0.5 mm. The cutouts are, in particular, so small that a vehicle occupant does not perceive any individual points of light when the at least one symbol is illuminated, that is to say when light is directed through the cutouts which represent a symbol. This produces a particularly elegant design. The vehicle occupant also cannot perceive the cutouts in the switched-off state owing to their small size.

The decorative layer comprises, for example, metal, glass, real wood and/or carbon-fiber-reinforced plastic or is composed of one of these materials. All of these materials are suitable for use as a decorative layer owing to their stability and their quality. Furthermore, the specified materials are often felt to be of particularly high value.

The interior assembly preferably comprises at least one touch-sensitive switching element. Therefore, operator control elements which can be activated by a vehicle occupant in order to actuate electrical loads of vehicle functions can also be integrated into the interior assembly. The touch-sensitive switching element is preferably a (projected) capacitive switching element. For example, the switching element is a touch film. Alternatively or additionally, the touch-sensitive switching element can also comprise one or more piezo-switches.

At least one light-guiding intermediate layer can be arranged between the touch-sensitive switching element and the decorative layer, in particular wherein the light-guiding intermediate layer is a plastic layer, for example comprises a transparent polycarbonate, and/or has been produced in a two component injection molding method. Light can be directed from the lighting unit via the intermediate layer to the cutouts and can be input into the cutouts. This has the advantage that a plurality of cutouts can be illuminated simultaneously, in particular those of a symbol, with one lighting unit. It is also possible to illuminate a plurality of symbols simultaneously in so far as the intermediate layer is assigned to the plurality of symbols.

Alternatively, at least one dividing element which divides the decorative layer into at least two illumination regions can be provided in the intermediate layer, wherein in particular in each case one lighting unit is assigned to the illumination regions.

In particular, the lighting unit can be positioned in a lateral region of the interior assembly in such a way that only the intermediate layer is located between the touch-sensitive switching element and the cutouts or the decorative layer. As a result, the capacitive coupling of the touch-sensitive switching element to a surface of the decorative layer is not adversely affected by the lighting unit.

The cutouts may extend into the light-guiding intermediate layer, in particular wherein the light-guiding intermediate layer is coupled to the material which serves as a light guide, for example is connected integrally or in a materially joined fashion. In other words, on a side directed away from the vehicle occupant the cutouts project out beyond the decorative layer, that is to say into the adjacent intermediate layer. As a result, light beams can be input laterally into the light guides, which has the result that a major part of the light beams irradiated by the lighting unit are input into the cutouts. This results in the symbols being sufficiently illuminated and clearly perceptible for a vehicle occupant.

The symbols can be embodied as switching symbols at the activation of which an assigned vehicle function is switched. For example, the switching symbols serve to switch on a lighting means or to lock or release vehicle doors. Operator control elements can therefore be integrated into a decorative layer without a switching element being necessary.

In the installed state of the interior assembly, the surface of the decorative layer is preferably at least part of the outer surface, directed toward the vehicle occupant, of the interior assembly. The symbols which are formed by the cutouts in the decorative layer can therefore always be seen well in so far as they are illuminated.

The objects are also achieved by means of a method for producing an interior assembly, which is configured as described above, having the following steps: making available a lighting unit and a decorative layer of a motor vehicle interior assembly, making cutouts in the decorative layer so that the cutouts represent at least one symbol, in particular by applying a laser, and mutually arranging the lighting unit and the decorative layer in such a way that light which is emitted by the lighting unit passes through the cutouts.

With such a method is particularly easily possible to make available an interior assembly having display elements and/or operator control elements, wherein the operator control elements are integrated into the decorative layer and can be seen by the vehicle occupant only when the lighting unit is switched on.

The cutouts may be filled with a light-guiding material, in particular wherein a light-guiding intermediate layer is provided which is made available, for example, together with the light-guiding material, in a two-component injection molding method. Light beams which are irradiated by the lighting unit can be directed without large losses through the light-conducting material and the light-conducting layer, through the cutouts to a surface of the decorative layer. In addition, the intermediate layer and the light guides which are made available by the light-guiding material can be produced cost-effectively in this way.

At least one touch-sensitive switching element can be assigned to the decorative layer, in particular wherein the light-guiding intermediate layer is arranged between the at least one touch-sensitive switching element and the decorative layer. As a result, the touch-sensitive switching element can be embodied as a (projected) capacitive switching element.

The light-guiding material which fills the cutouts can be smoothed by knife and/or ground together with the decorative layer. In this way, the decorative layer is provided with an even surface, which permits a particularly high-quality appearance to be achieved.

Other objects, advantages and novel features of the present invention will become apparent from the following detailed description of one or more preferred embodiments when considered in conjunction with the accompanying drawings, in which:

DETAILED DESCRIPTION OF EMBODIMENTS

Figure 1:
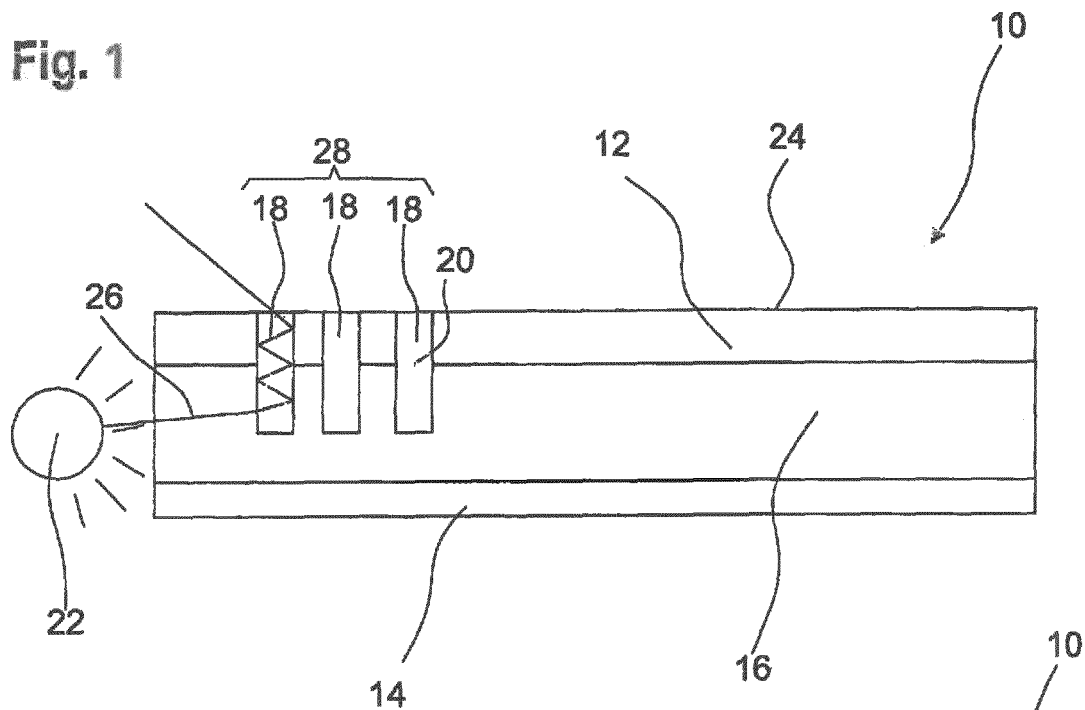
FIG. 1 shows a schematic view of an interior assembly in a sectional illustration.

FIG. 1 shows a schematic view of an interior assembly 10 in a sectional illustration. The interior assembly 10 comprises a decorative layer 12, a touch-sensitive switching element 14 and a light-guiding intermediate layer 16 which is arranged between the decorative layer 12 and the touch-sensitive switching element 14. In this respect, a sandwich design is produced for the interior assembly 10.

The decorative layer 12 is constructed, for example, from wood, glass, metal and/or CFC. Alternatively, the decorative layer 12 can comprise at least one region made of wood, glass, metal and/or CFC.

The touch-sensitive switching element 14 can be a so-called touch film.

A plurality of cutouts 18 are arranged in the decorative layer 12. These cutouts 18 project into the intermediate layer 16 and are filled with a light-guiding material 20. For example, the cutouts 18 have a round profile and a diameter of less than 1 mm, in particular less than 0.5 mm. The cutouts 18 can be made by means of laser cutting into the decorative layer 12. However, the invention is not limited to round cutouts 18; the cutouts 18 can basically have any desired geometry.

The intermediate layer 16 can be embodied in one piece or in a materially joined fashion with the material 20 which serves as the light guide by forming the intermediate layer 16 and the light-guiding material 20 in a two-component injection molding method.

At least one lighting unit 22 is arranged on the side of the interior assembly 10. The lighting unit 22 comprises, for example, one or more LEDs or other lighting means.

The light beams which are irradiated by the lighting unit 22 can be input via the intermediate layer 16 into the light-guiding material 20 which is provided in the cutouts 18 and in this way can be guided to a surface 24 of the decorative layer 12, which surface 24 is directed toward a passenger compartment of the vehicle. A vehicle occupant looks at the surface 24, which accordingly the external surface of the interior assembly 10.

This is illustrated by way of example for a multiplicity of light beams on the basis of an individual light beam 26. The light beam 26 exits the cutout 18 at the surface 24 of the decorative layer 12. As a result, the cutouts 18 can be perceived as illuminated dots by a vehicle occupant. If a plurality of cutouts 18 are illuminated by the at least one lighting unit 22, then the cutouts 18 can be perceived as at least one illuminated symbol 28 by vehicle occupant. For this purpose, the cutouts 18 are so small and are arranged so close to one another that a viewer does not perceive the cutouts 18 as individual dots.

In order to improve the visibility of the symbols 28, the decorative layer 12 can have diffusor particles at least in the region of the cutouts 18. Exiting light beams 26 can be refracted at the diffusor particles so that the at least one symbol 28 can be perceived from different viewing angles by a vehicle occupant.

If the lighting unit 22 is switched off, the symbol 28 is virtually invisible. As a result, the design of the interior assembly can be particularly elegant, in particular no mechanical elements such as switches or the like are visible.

By means of the touch-sensitive switching element 14, the symbol 28 can serve as an operator control element for electrical loads. For example, contact with the symbol 28 by the switching element 14 is sensed by means of a capacitive coupling, in response to which a signal is passed onto an electrical load.

Figure 2:
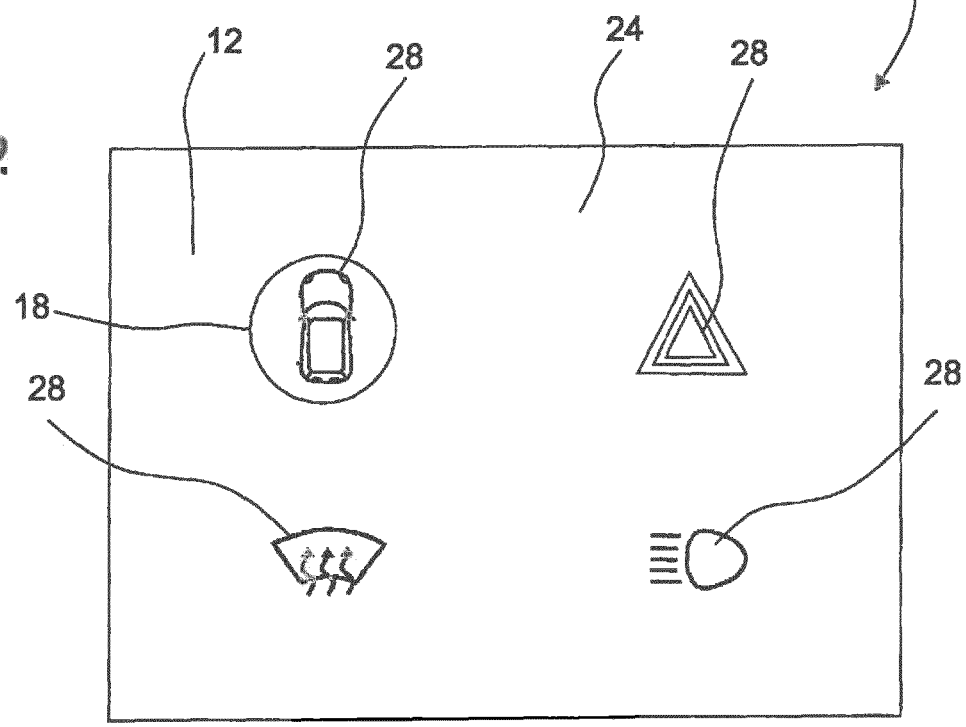
FIG. 2 shows an interior assembly in a plan view.

FIG. 2 shows an interior assembly 10 in a plan view. The decorative layer 12 of the interior assembly 10 comprises a multiplicity of cutouts 18 which together form a plurality of symbols 28. The selected symbols 28 are merely selected by way of example; a multiplicity of further symbols 28 are conceivable. A symbol 28 can serve as an operator control element for activating the flashing hazard warning system or the vehicle heating system.

Generally, the interior assembly 10 can comprise a plurality of illuminated regions, each of which is assigned a lighting unit 22. Each illuminated region comprises at least part of a symbol 28 and the assigned cutout 18. As a result, a plurality of symbols 28 can be illuminated independently of one another, in particular in accordance with an operating state of the motor vehicle.

In the text which follows an exemplary method for producing an interior assembly 10 is explained.

After the provision of a lighting unit 22 and of a decorative layer 12, cutouts 18 which correspond to symbols 28 which are to be displayed are made in the decorative layer 12. The cutouts 18 accordingly represent at least one symbol 28. The cutouts 18 can be fabricated with a laser.

At least the cutouts 18 are filled with the light-guiding material 20, in particular wherein the light-guiding intermediate layer 16 is provided (at the same time), which intermediate layer 16 is for example made available together with the light-guiding material 20 in a two-component injection molding method.

The lighting unit 22 and the decorative layer 12 are then arranged with respect to one another in such a way that light which is emitted by the lighting unit 22 passes through the cutouts 18.

The light-guiding material 20 which fills the cutouts 18 is preferably subsequently smoothed by knife and/or ground with the decorative layer 12 so that an even surface 24 is produced.

Diffusor particles can also be introduced beforehand into the regions of the symbols 18 in order to improve the visibility of the symbols 18 from different angles.

Generally, a touch-sensitive switching element 14 can be assigned to the decorative layer 12 so that during the production of the interior assembly 10 corresponding switching symbols which can be enabled to activate or deactivate a vehicle function can be made available at the same time.

The foregoing disclosure has been set forth merely to illustrate the embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An interior assembly for a motor vehicle, comprising:
    a decorative layer; and
    a lighting unit, wherein
        the decorative layer has a plurality of cutouts which are arranged with respect to one another in such a way that they represent at least one symbol,
        the lighting unit is assigned to the cutouts in such a way that the light which is emitted by the lighting unit in the switched on state of the lighting unit is directed through at least some of the cutouts to a surface of the decorative layer, and
        the interior assembly comprises at least one touch sensitive switching element; and
        at least one light guiding intermediate layer is arranged between the at least one touch sensitive switching element and the decorative layer, and wherein the at least one light guiding intermediate layer is a plastic layer that comprises a transparent polycarbonate and/or has been produced in a two component injection molding method.

2. The interior assembly according to claim 1, wherein the decorative layer has diffusor particles in the region of an edge of the plurality of cutouts, and the cutouts are each filled with a material which serves as a light guide.

3. The interior assembly according to claim 2, wherein the material which serves as a light guide contains at least one light-guiding particle.

4. The interior assembly according to claim 3, wherein the cutouts have a diameter of less than 0.5 mm.

5. The interior assembly according to claim 4, wherein the decorative layer comprises metal, glass, real wood and/or carbon fiber reinforced plastic or is composed of one of these materials.

6. The interior assembly according to claim 1, wherein the cutouts extend into the light guiding intermediate layer, and wherein the light guiding intermediate layer is coupled to the material which serves as a light guide is connected integrally or in a materially joined fashion.

7. The interior assembly according to claim 6, wherein the symbols are embodied as switching symbols at the activation of which an assigned vehicle function is switched.

8. The interior assembly according to claim 7, wherein the installed state of the interior assembly the surface of the decorative layer is at least part of the outer surface, directed toward the vehicle occupant, of the interior assembly.

9. A method for producing an interior assembly, the method comprising the acts of:
    making available a lighting unit and a decorative layer of a motor vehicle interior assembly;
    making cutouts in the decorative layer so that the cutouts represent at least one symbol, by applying a laser; and
    arranging the lighting unit and the decorative layer with respect to one another in such a way that light which is emitted by the lighting unit passes through the cutouts,
    the cutouts are filled with a light guiding material, wherein a light guiding intermediate layer is provided which is made available together with the light guiding material in a two component injection molding method, and at least one touch sensitive switching element is assigned to the decorative layer, wherein the light guiding intermediate layer is arranged between the at least one touch sensitive switching element and the decorative layer.

10. The method according to claim 9, wherein the light guiding material which fills the cutouts is smoothed by knife and/or ground together with the decorative layer.

\* \* \* \* \*